(12) United States Patent
Chen et al.

(10) Patent No.: US 11,117,589 B2
(45) Date of Patent: Sep. 14, 2021

(54) SYSTEM AND METHOD FOR DETERMINING ROADWAY BANK ANGLE

(71) Applicant: GM GLOBAL TECHNOLOGY OPERATIONS LLC, Detroit, MI (US)

(72) Inventors: Jinzhu Chen, Troy, MI (US); Shu Chen, Rochester Hills, MI (US); Fan Bai, Ann Arbor, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 380 days.

(21) Appl. No.: 16/260,582

(22) Filed: Jan. 29, 2019

(65) Prior Publication Data
US 2020/0239000 A1    Jul. 30, 2020

(51) Int. Cl.
| B60G 17/016 | (2006.01) |
| B60W 40/076 | (2012.01) |
| G01S 19/42  | (2010.01) |

(52) U.S. Cl.
CPC .......... B60W 40/076 (2013.01); G01S 19/42 (2013.01); *B60W 2520/18* (2013.01); *B60W 2530/10* (2013.01); *B60W 2552/40* (2020.02); *B60W 2556/60* (2020.02)

(58) Field of Classification Search
CPC .......... B60W 40/076; B60W 2552/40; B60W 2556/60; B60W 2530/10; B60W 2520/18; B60W 2040/1307; B60W 2520/125; B60W 2552/30; B60W 2552/25; B60W 2510/22; B60W 2556/50; B60W 40/06; G01S 19/42; G01S 19/14; G01S 19/33; G01S 19/47; G01C 21/3415; G01C 21/165; B60G 17/016

USPC ........................................................ 701/38
See application file for complete search history.

(56) References Cited

U.S. PATENT DOCUMENTS

| 6,112,147 A | 8/2000 | Ghoneim et al. | |
|---|---|---|---|
| 2004/0160358 A1* | 8/2004 | Jonsson ................ | G01C 21/28 342/357.51 |
| 2004/0176889 A1* | 9/2004 | Capito ............... | B60G 17/0182 701/37 |
| 2007/0008090 A1* | 1/2007 | Gertsch .................... | B60Q 9/00 340/435 |
| 2007/0032245 A1* | 2/2007 | Alapuranen ............ | H04W 4/02 455/456.1 |
| 2014/0365488 A1* | 12/2014 | Arslan .................. | G06F 16/275 707/736 |
| 2015/0344038 A1* | 12/2015 | Stenneth ................ | G07C 5/008 340/439 |

(Continued)

*Primary Examiner* — Shardul D Patel
(74) *Attorney, Agent, or Firm* — Lorenz & Kopf LLP

(57) ABSTRACT

A system and method for determining a roadway bank angle based on vehicle information. The method may include the steps of: obtaining vehicle information from at least one vehicle, the vehicle information is obtained from at least one of a global navigational satellite system (GNSS) receiver and one or more onboard vehicle sensors, and the GNSS receiver and the one or more onboard vehicle sensors are installed in the at least one vehicle; performing a roadway bank angle determination process using the obtained vehicle information to obtain a roadway bank angle; and updating a representative roadway bank angle based on the roadway bank angle.

18 Claims, 6 Drawing Sheets

(56) References Cited

U.S. PATENT DOCUMENTS

| | | | |
|---|---|---|---|
| 2016/0116293 A1* | 4/2016 | Grover | G01C 21/34 |
| | | | 701/23 |
| 2017/0364082 A1* | 12/2017 | Taieb | B62D 15/025 |
| 2018/0022403 A1* | 1/2018 | Fahland | B62D 35/02 |
| | | | 701/49 |
| 2018/0339709 A1* | 11/2018 | Tiwari | G05D 1/0212 |
| 2019/0143970 A1* | 5/2019 | Chen | G01C 9/00 |
| | | | 701/93 |
| 2019/0210591 A1* | 7/2019 | Low | B60W 50/0098 |
| 2019/0291742 A1* | 9/2019 | Leach | G01C 21/28 |

* cited by examiner

FIG. 1
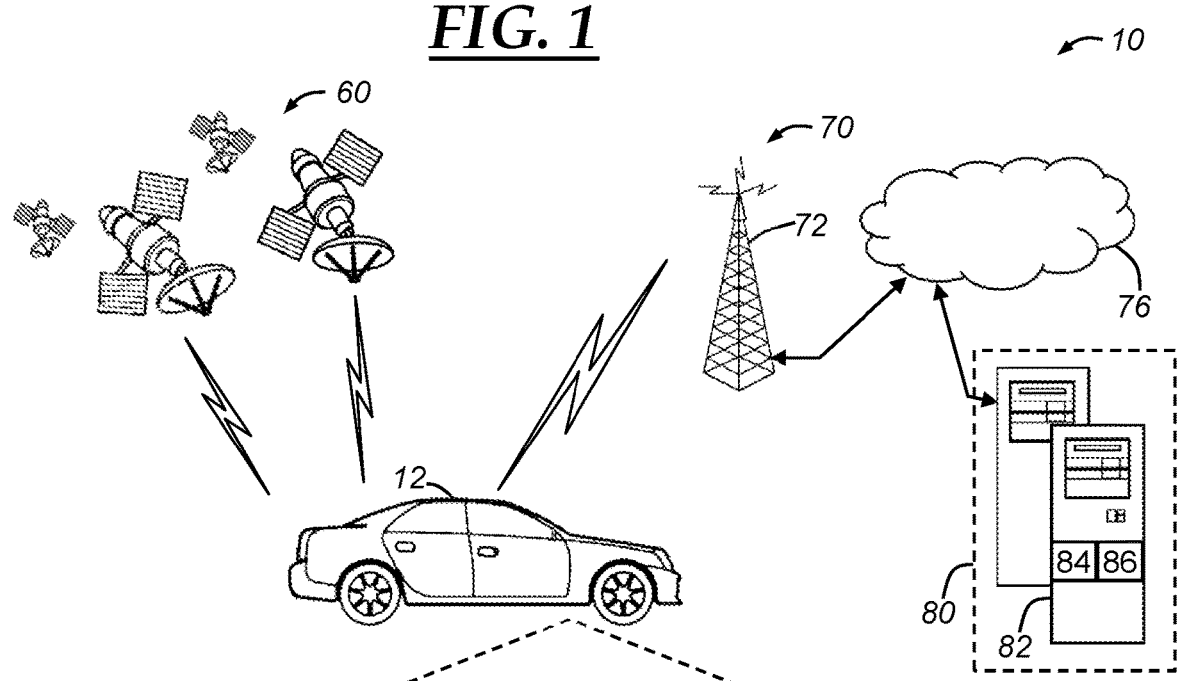
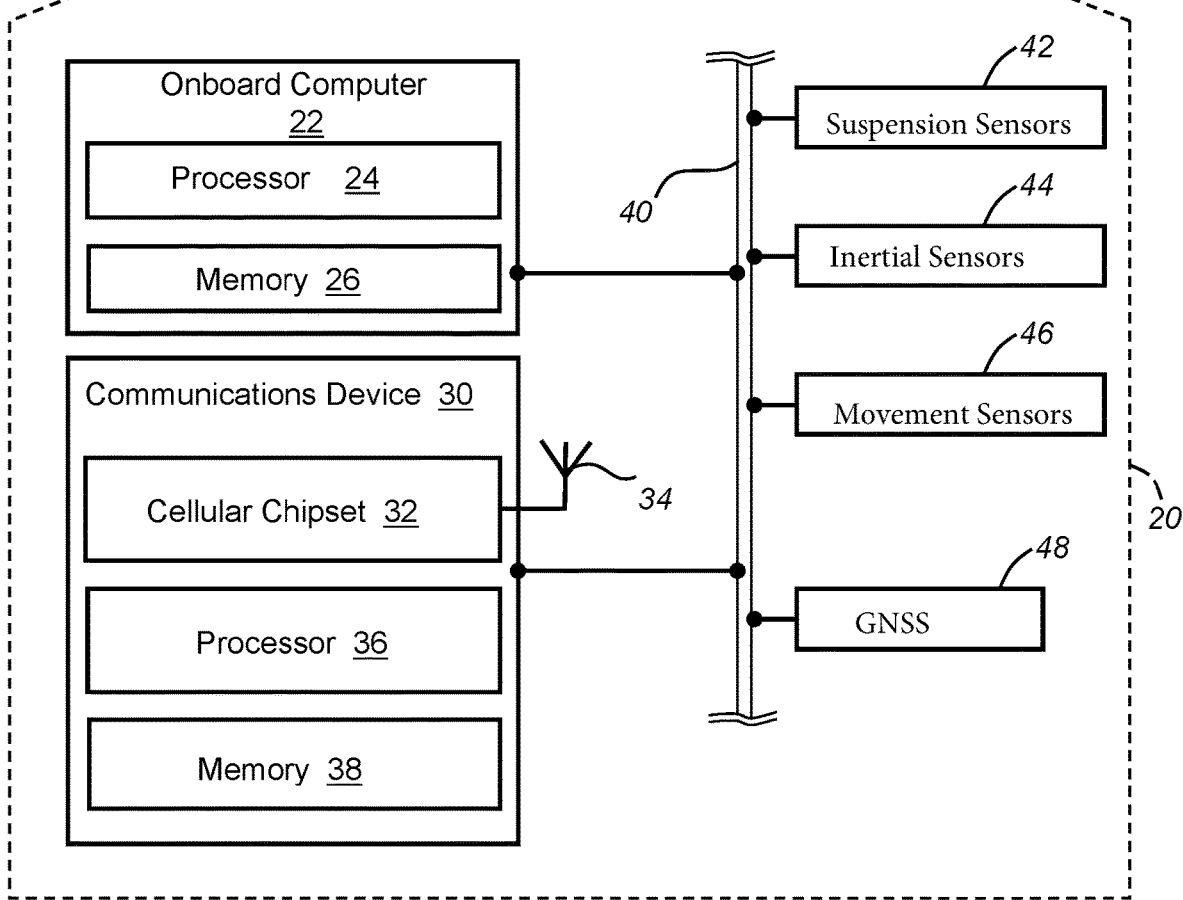

$$a_y = a_f \cdot \cos\beta + g \cdot \sin(\beta - \alpha)$$

$$\alpha = \beta - \arcsin\frac{a_y - a_f \cos\beta}{g}$$

$$a_f = H(\beta) = H(h(\Delta D))$$

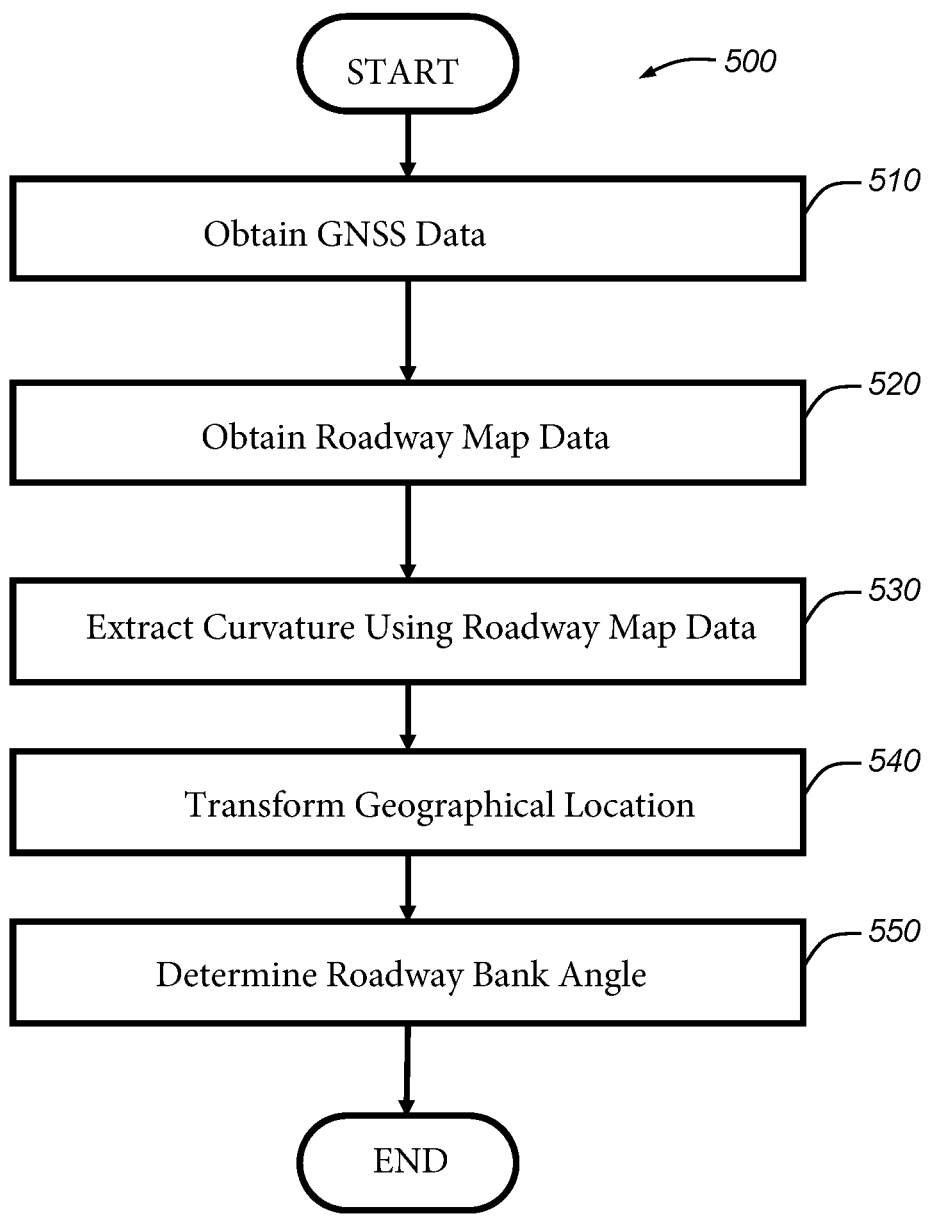

SYSTEM AND METHOD FOR DETERMINING ROADWAY BANK ANGLE

TECHNICAL FIELD

The present disclosure relates to determining roadway properties, such as a roadway bank angle, based on information obtained by a vehicle.

BACKGROUND

Vehicles include electronic control units (ECUs) that carry out various tasks for the vehicle. Many vehicles now include various sensors to sense information concerning the vehicle's operation, including the vehicle's position and trajectory. Some roadways include roadway banks (or "banks" for short) in which the roadway is laterally inclined or rolled (i.e., angled with respect to the roll axis), normally as a part of a banked curve or turn, so that friction between the vehicle wheels and the roadway is reduced and/or so that the vehicle's travel along the roadway (e.g., around the roadway curve) is facilitated.

Thus, it may be desirable to provide a system and/or method for determining a roadway bank angle of a roadway based on information obtained at one or more vehicles.

SUMMARY

According to one aspect, there is provided a method of determining a roadway bank angle based on vehicle information. The method includes the steps of: obtaining vehicle information from at least one vehicle, the vehicle information is obtained from at least one of a global navigational satellite system (GNSS) receiver and one or more onboard vehicle sensors, and the GNSS receiver and the one or more onboard vehicle sensors are installed in the at least one vehicle; performing a roadway bank angle determination process using the obtained vehicle information to obtain a roadway bank angle; and updating a representative roadway bank angle based on the roadway bank angle.

According to various embodiments, the method may further include any one of the following features or any technically-feasible combination of some or all of these features:

- the roadway bank angle determination process is a vehicle-dynamics-based roadway bank angle determination process;
- the obtaining vehicle information step includes obtaining onboard vehicle sensor data from the one or more onboard vehicle sensors of the at least one vehicle;
- the onboard vehicle sensor data includes suspension sensor data from a plurality of suspension sensors installed on the at least one vehicle;
- the vehicle-dynamics-based roadway bank angle determination process includes determining a friction acceleration of the at least one vehicle based on the suspension sensor data;
- the vehicle-dynamics-based roadway bank angle determination process includes determining a roll angle of the at least one vehicle;
- the roll angle is determined based on the suspension sensor data using a suspension distance-to-roll angle function;
- the vehicle-dynamics-based roadway bank angle determination process includes determining the friction acceleration through use of a roll angle-to-friction acceleration function or a suspension distance-to-friction acceleration function, and determining a lateral acceleration of the at least one vehicle based on the onboard vehicle sensor data;
- the following equation is used to determine the roadway bank angle $\alpha$ using the friction acceleration $a_f$ and the lateral acceleration $a_y$:

$$\alpha = \beta - \sin^{-1} \frac{a_y - a_f \cos \beta}{g};$$

- the roll angle-to-friction acceleration function is a modified roll angle-to-friction acceleration function that takes into consideration a weight distribution index and a roadway roughness index;
- the roadway bank angle determination process is an elevation-based roadway bank angle determination process;
- the vehicle information includes GNSS data that is used to obtain a geographical location of the at least one vehicle, and wherein the GNSS data includes an elevation of the at least one vehicle and is obtained from the GNSS receiver installed in the at least one vehicle;
- the elevation-based roadway bank angle determination process includes obtaining roadway map data of an area that contains the geographical location of the at least one vehicle and that includes a portion of a roadway with a roadway curve that is banked;
- a curvature extraction process is carried out using the roadway map data to extract roadway curve information concerning the roadway curve, wherein the roadway curve information includes a geographical point representing a center of curvature of the roadway curve;
- the elevation-based roadway bank angle determination process includes performing linear regression on a plurality of radial distance-elevation data points derived from a plurality of vehicles travelling along the roadway curve;
- a linear regression result is obtained from the linear regression, and wherein the roadway bank angle is determined based on the linear regression result;
- the method is carried out at a remote facility that is located remotely from the at least one vehicle, wherein the at least one vehicle includes a first plurality of vehicles and a second plurality of vehicles, wherein the elevation-based roadway bank angle determination process is carried out for the first plurality of vehicles and for the second plurality of vehicles, and wherein the updating step includes aggregating results of the elevation-based roadway bank angle determination processes for the first plurality of vehicles and for the second plurality of vehicles to obtain the representative roadway bank angle; and/or
- the at least one vehicle is a plurality of vehicles, wherein the method includes performing a plurality of roadway bank angle processes for the plurality of vehicles, wherein the plurality of roadway bank angle processes includes a vehicle-dynamics-based roadway bank angle determination process and an elevation-based roadway bank angle determination process, and wherein the updating step includes fusing or otherwise combining results of each of the plurality of roadway bank angle processes to obtain the representative roadway bank angle.

According to another aspect, there is provided a method of determining a roadway bank angle based on vehicle information. The method includes the steps of: obtaining onboard vehicle sensor data from a vehicle using onboard vehicle sensors installed on the vehicle, wherein the onboard vehicle sensor data includes suspension sensor data; deriving a lateral acceleration and a friction acceleration from the onboard vehicle sensor data; and determining a roadway bank angle based on the lateral acceleration and the friction acceleration.

According to another aspect, there is provided a method of determining a roadway bank angle based on vehicle information. The method includes the steps of: for each of a plurality of vehicles, obtaining global navigation satellite system (GNSS) data from a GNSS receiver installed the vehicle, wherein the GNSS data includes a geographical location of the vehicle, and wherein the geographical location includes an elevation; obtaining roadway map data of an are containing a roadway curve along which the plurality of vehicles is travelling or has travelled; extracting roadway curve information concerning the roadway curve using the obtained roadway map data; mapping the geographical locations of the plurality of vehicles to the extracted roadway curve information to determine a radial distance of each geographical location as taken from a center of curvature of the roadway curve; and deriving a representative roadway bank angle based on the radial distances and elevation of each of the plurality of vehicles through using a linear regression technique.

BRIEF DESCRIPTION OF THE DRAWINGS

One or more embodiments of the disclosure will hereinafter be described in conjunction with the appended drawings, wherein like designations denote like elements, and wherein:

FIG. 1 is a block diagram depicting an embodiment of a communications system that is capable of utilizing the method disclosed herein;

FIG. 7 is a flowchart depicting an embodiment of an elevation-based roadway bank angle determination process that can be carried out as a part of a method of determining a roadway bank angle based on vehicle information;

DETAILED DESCRIPTION OF THE ILLUSTRATED EMBODIMENT(S)

Figure 2:
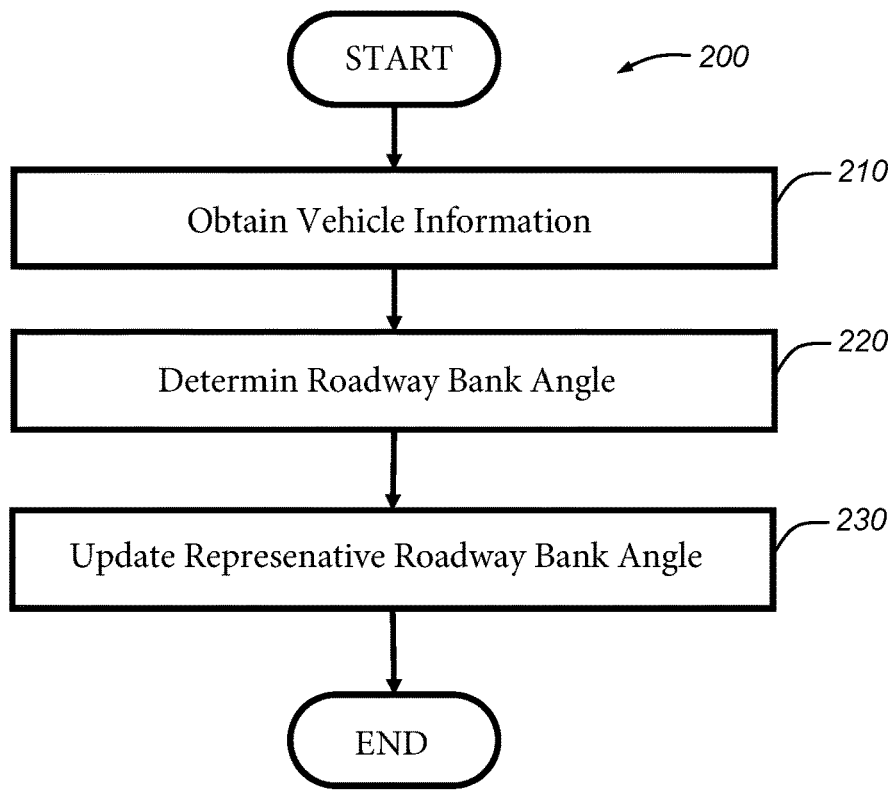
FIG. 2 is a flowchart depicting an embodiment of a method of determining a roadway bank angle based on vehicle information.

The system and method below enable a roadway bank angle to be determined based on information obtained from a vehicle. The information obtained from a vehicle can be referred to as vehicle information, and can include global navigation satellite system (GNSS) data and/or onboard vehicle sensor data. In at least one embodiment, the vehicle information can be used as input into a roadway bank angle determination process that can be carried out as a part of a method of determining a roadway bank angle based on vehicle information. Once the roadway bank angle is determined, it can be added to various types of navigational maps and can be useful for vehicle dynamics control, particularly in the context of autonomous vehicles.

According to one embodiment, the roadway bank angle determination process is a vehicle-dynamics-based roadway bank angle determination process in which a roadway bank angle is determined based on onboard vehicle sensor data, such as suspension sensor data from a plurality of suspension sensors installed on the vehicle. According to another embodiment, the roadway bank angle determination process is an elevation-based roadway bank angle determination process in which a roadway bank angle is determined based on GNSS data from a plurality of vehicles, which can include mapping the geographical location of the vehicles to extracted curvature information of a roadway curve. In a particular embodiment of the elevation-based roadway bank angle determination process, a radial distance and elevation of each vehicle can be derived from the GNSS data and roadway map data, and this information can then be used along with a linear regression technique to determine a roadway bank angle, which corresponds to the slope of the linear regression line as explained more below. The results of these different embodiments of the roadway bank angle determination process can be combined, fused, and/or otherwise joined together to compensate for one another and, thereby, increase the accuracy of the roadway bank angle estimation.

FIG. 1 illustrates an operating environment that comprises a communications system 10 and that can be used to implement the method disclosed herein. Communications system 10 generally includes at least one vehicle 12 with vehicle electronics 20, a plurality of global navigation satellite system (GNSS) satellites 60, a wireless carrier system 70, a land network 76, and a remote facility 80. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), etc., can also be used. Portions of the vehicle electronics 20 are shown generally in FIG. 1 and include an onboard computer 22, wireless communications device 30, a communications bus 40, onboard vehicle sensors 42-46, and a GNSS receiver 48. Some or all of the different vehicle electronics may be connected for communication with each other via one or more communication busses, such as communications bus

40. The communications bus 40 provides the vehicle electronics 20 with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

Skilled artisans will appreciate that the schematic block diagram of the vehicle electronics 20 is simply meant to illustrate some of the more relevant hardware components used with the present method and it is not meant to be an exact or exhaustive representation of the vehicle hardware that would typically be found on such a vehicle. Furthermore, the structure or architecture of the vehicle electronics 20 may vary substantially from that illustrated in FIG. 1. Thus, because of the countless number of potential arrangements and for the sake of brevity and clarity, the vehicle electronics 20 is described in conjunction with the illustrated embodiment of FIG. 1, but it should be appreciated that the present system and method are not limited to such.

Onboard computer 22 is part of the vehicle electronics 20 and includes a processor 24 and memory 26. In one embodiment, the onboard computer 22 can be configured to perform one or more steps of the method(s) discussed below. Also, in embodiments where the onboard computer 22 carries out one or more method steps, the onboard computer 22 can do so using the processor 24. According to various embodiments, the onboard computer 22 can be integrated into other devices or components of the vehicle electronics 20. Additionally, at least in some embodiments, onboard computer 22 can be (or be integrated with) an infotainment unit (e.g., infotainment head unit, in-car entertainment (ICE) unit, in-vehicle infotainment (IVI)), a vehicle head unit, a center stack module (CSM), or vehicle navigation module.

Wireless communications device 30 provides the vehicle with long range wireless communication capabilities so that the vehicle can communicate and exchange data with other devices or systems that are not a part of the vehicle electronics 20, such as the remote computer 82 of the remote facility 80. In the illustrated embodiment, the wireless communications device 30 includes a cellular chipset 32, antenna 34, a processor 36, and memory 38. The cellular chipset 32 can be a cellular chipset that enables cellular wireless communications, such as those used with wireless carrier system 70. The antenna 34 of the wireless communications device 30 can be used to transmit and receive these wireless communications. In some embodiments, the wireless communications device 30 can include (or can be communicatively coupled to) a short-range wireless communications (SRWC) circuit that enables short-range wireless communications (e.g., Bluetooth™, other IEEE 802.15 communications, vehicle-to-vehicle (V2V) communications, vehicle-to-infrastructure (V2I) communications, Wi-Fi™, other IEEE 802.11 communications, etc.) with any number of nearby devices. This SRWC circuit can be provided in addition to the cellular chipset and may be a part of the same module. In other embodiments, the SRWC circuit and the cellular chipset 32 can be a part of different modules—for example, the SRWC circuit can be a part of an infotainment unit and the cellular chipset 32 can be a part of a telematics unit that is separate from the infotainment unit.

Onboard vehicle sensors 42-46 can capture or sense information pertaining to the vehicle, which can then be sent to one or more other parts of the vehicle electronics 20 and/or external systems or devices, such as the remote facility 80. The onboard vehicle sensor data obtained by the onboard vehicle sensors 42-46 can be associated with a time indicator (e.g., a timestamp), as well as other metadata or information. The onboard vehicle sensor data can be obtained by the onboard vehicle sensors 42-46 in a raw format, and/or may be processed by the sensors, such as for purposes of compression, filtering, and/or other formatting, for example. Moreover, the onboard vehicle sensor data (in its raw or formatted form) can be sent to one or more other portions of the vehicle electronics 20 via communications bus 40, such as to the wireless communications device 30 and/or to the onboard computer 22. In at least one embodiment, the wireless communications device 30 can package the onboard vehicle sensor data for transmission and send the onboard vehicle sensor data to other systems or devices, such as a remote computer 82 at the remote facility 80.

Suspension sensors 42 are used to provide suspension sensor data, which is a type of onboard vehicle sensor data. The suspension sensors 42 can be any type of sensor that can acquire this suspension sensor data. The suspension sensor data can be used to determine a suspension distance, which is a distance between an associated vehicle wheel (or the ground) and a reference point of the vehicle body. In one embodiment, the suspension sensors 42 can include a strain gauge that can generate suspension sensor data used to determine a suspension distance. Those skilled in the art will appreciate that various suspension sensors can be used to provide the suspension sensor data, which can then be used to determine a suspension distance. In one example, the suspension distance represents a distance between a reference point on the vehicle wheel and a reference point on the vehicle body, and/or may represent the change (or difference) between a resting suspension distance and a measured suspension distance. In one embodiment, the vehicle includes four wheels and four suspension sensors 42, each of which is associated with one of the vehicle wheels. Of course, in other embodiments, the vehicle can include a different number of wheels and/or suspension sensors.

Inertial sensor 44 is a movement sensor that is installed on the vehicle as an onboard vehicle sensor. Although only a single inertial sensor 44 is shown and described, it should be appreciated that the vehicle 12 can include any number of inertial sensors. The inertial sensor 44 can be used to obtain inertial sensor data, which is a type of onboard vehicle sensor data that may be used to determine the acceleration and the direction of the acceleration of the vehicle or a part thereof. The inertial sensor data is a type of movement sensor data and also a type of onboard vehicle sensor data. The inertial sensor 44 can be microelectromechanical systems (MEMS) sensor or accelerometer, and may be part of an inertia measurement unit (IMU). The inertial sensor 44 can be used to detect collisions based on a detection of a relatively high deceleration, as well as other events, such as when the vehicle is entering a segment of a roadway that has a roadway bank angle above a predetermined threshold amount. In one embodiment, inertial sensor data can be continuously gathered and sent to the onboard computer 22 (or other portions of the vehicle electronics 20), which may then process the inertial sensor data, such as by using this data in the roadway bank angle determination process, which can also be continuously carried out. In another embodiment, when an event is detected, inertial sensor data from the inertial sensor 44 can be sent to the onboard computer 22 (or other portions of the vehicle electronics 20 (e.g., wireless communications device 30)), which can then process the inertial sensor data and/or send the inertial sensor data (or information based thereon or derived therefrom) to the remote facility 80. In one embodiment, the vehicle 12 can include a plurality of inertial sensors located throughout the vehicle. And, in some embodiments, any one or more of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The vehicle 12 can include other movement sensors 46 that can be used to obtain movement sensor data concerning the vehicle, such as vehicle speed, acceleration, yaw (and yaw rate), pitch, roll, and various other attributes of the vehicle concerning its movement as measured locally through use of onboard vehicle sensors. The movement sensors 46 can be mounted on the vehicle in a variety of locations, such as within an interior vehicle cabin, on a front or back bumper of the vehicle, at the vehicle wheels, and/or on the hood of the vehicle 12. The movement sensors 46 can be coupled to various other portions of the vehicle electronics 20 directly or via the communications bus 40. Movement sensor data (i.e., onboard vehicle sensor data obtained by movement sensors 44, 46) can be obtained and sent to the other portions of the vehicle electronics 20, including the wireless communications device 30 and/or the onboard computer 22.

In one embodiment, the movement sensors 46 can include wheel speed sensors, which can be installed on the vehicle as onboard vehicle sensors. The wheel speed sensors are each coupled to a wheel of the vehicle 12 and can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. In some embodiments, wheel speed sensors can be referred to as vehicle speed sensors (VSS) and can be a part of an anti-lock braking (ABS) system of the vehicle 12 and/or an electronic stability control program.

Alternatively or additionally, the movement sensors 46 can include one or more yaw rate sensors, which can be installed on the vehicle as an onboard vehicle sensor. The yaw rate sensor(s) can obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

Alternatively or additionally, the movement sensors 46 can also include a steering wheel angle sensor, which can be installed on the vehicle as an onboard vehicle sensor. The steering wheel angle sensor is coupled to a steering wheel of vehicle 12 or a component of the steering wheel, which can be a part of the steering column. The steering wheel angle sensor can detect the angle that a steering wheel is rotated, which can correspond to the angle of one or more vehicle wheels with respect to a longitudinal axis of vehicle 12 that runs from the back to the front of the vehicle.

Global navigation satellite system (GNSS) receiver 48 receives radio signals (referred to as GNSS signals) from the plurality of GNSS satellites 60. The GNSS receiver 48 can be configured to comply with and/or operate according to particular regulations or laws of a given geopolitical region (e.g., country). The GNSS receiver 48 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. The GNSS receiver 48 can include at least one processor and memory, including a non-transitory computer readable memory storing instructions (software) that are accessible by the processor for carrying out the processing performed by the GNSS receiver 48. The GNSS receiver 48 may be used to provide navigation and other position-related services to the vehicle operator. The navigation services can be provided using a dedicated in-vehicle navigation module (which the GNSS receiver 48 can be a part of and/or incorporated as a part of the wireless communications device 30), or some or all navigation services can be done via the wireless communications device 30 (or other telematics-enabled device) installed in the vehicle, wherein the position information is sent to a remote location for purposes of providing the vehicle with navigation maps, map annotations (points of interest, restaurants, etc.), route calculations, and the like.

The GNSS receiver 48 can thus determine a geographical location of the vehicle 12 based on information contained in a plurality of GNSS signals received from the plurality of GNSS satellites 60. The geographical location can include or be represented by a geographical coordinate, which can be a longitudinal/latitudinal coordinate pair, for example. Also, in at least some embodiment, the geographical location can include an elevation. In some embodiments, the GNSS receiver 48 (or other portion of the vehicle electronics 20) can determine a vehicle trajectory or other position-related information pertaining to the vehicle 12, which can include a vehicle location, a vehicle heading, a vehicle speed (or velocity), a vehicle acceleration, etc. This data obtained or derived from the GNSS receiver 48 (i.e., the "GNSS data") can be sent to other portions of the vehicle electronics 20, including the wireless communications device 30 and/or the onboard computer 22. The GNSS data may also be sent from the wireless communications device 30 to the remote facility 80 via the wireless carrier system 70 and/or the land network 76.

Wireless carrier system 70 may be any suitable cellular telephone system. Wireless carrier system 70 is shown as including a cellular tower 72; however, the wireless carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UE) (e.g., wireless communications device 30 in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

Remote facility 80 is a facility that is located remotely from the vehicle 12 and includes one or more electronic computing devices, such as remote computer 82. In the illustrated embodiment, the remote facility 80 includes at least one remote computer 82, which includes a processor 84 and memory 86. The remote facility 80 can be used for one or more purposes, such as for providing backend vehicle services for one or more vehicles, as well as any other cloud-based services. In one embodiment, the remote facility 80 includes a network of remote servers 82 hosted on the interne in a cloud configuration to carry out all or part of the method discussed herein. For example, the processor 84 can execute computer instructions stored on memory 86, which can cause the remote facility 80 to carry out at least a part of the method discussed herein.

Any one or more of the processors discussed herein (e.g., processor 24, processor 36) can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. The processor can execute various types of electronic instructions, such as software and/or firmware programs stored in memory, which enable the module to carry out various functionality. Any one or more of the memory discussed herein (e.g., memory 26, memory 38) can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. Moreover, although certain devices or components of the vehicle electronics 20 may be described as including a processor and/or memory, the processor and/or memory of such devices or components may be shared with other devices or components and/or housed in (or a part of) other devices or components of the vehicle electronics 20—for example, any of these processors or memory can be a dedicated processor or memory used only for module or can be shared with other vehicle systems, modules, devices, components, etc.

With reference to FIG. 2, there is shown a flowchart depicting an exemplary method 200 of determining a roadway bank angle based on vehicle information. The method 200 can be carried out by the vehicle electronics 20, the remote facility 80, or a combination thereof. In one embodiment, the remote facility 80 carries out the method 200. In another embodiment, the onboard computer 22 and/or other portions of the vehicle electronics 20 can carry out steps 210 and/or 220, and the remote facility 80 can carry out step 230. Also, in embodiments where the vehicle electronics 20 carries out one or more steps, the vehicle electronics 20 can do so using existing vehicle hardware. The term "roadway," as it is used herein, broadly includes any type of road (e.g., rural road, suburban street, highway or expressway, etc.) on which the vehicle 12 can drive. The "roadway bank angle," as it is used herein, refers to the lateral angle or slope of a banked section of a roadway; typically, the lateral angle of a banked turn or curve where the roadway has a downslope to the inside of the turn or curve.

The method 200 begins with step 210, wherein vehicle information is obtained. The vehicle information is initially obtained at the vehicle and may include onboard vehicle sensor data gathered from one or more onboard vehicle sensors or GNSS data gathered from a GNSS receiver. The particular type of vehicle information that is obtained can be based on the particular roadway bank angle determination process that is to be carried out (see step 220). For example, where a vehicle-dynamics-based approach is used for the roadway bank angle determination process (see method 300 of FIG. 3), the vehicle information can include onboard vehicle sensor data that is obtained from the onboard vehicle sensors 42-46 (e.g., the inertial sensor 44 can provide lateral acceleration data of the vehicle 12 and the suspension sensors 42 can provide suspension distances). In another example where an elevation-based approach is used for the roadway bank angle determination process (see method 500 of FIG. 7), GNSS data including a geographical location of the vehicle 12 can be obtained using the GNSS receiver 48. In various embodiments, the method may obtain other types of vehicle information from the onboard vehicle sensors 42-46, GNSS receiver 48, or other parts of the vehicle electronics 20, such as movement sensor data from other movement sensors 44, other onboard vehicle sensor data, etc., as well as data that does not constitute "vehicle information."

In some embodiments, the step 220 described below can be carried out at a remote facility, such as the remote facility 80. In such embodiments, the vehicle information can first be gathered, derived, and/or otherwise obtained by the vehicle electronics 20, and then sent to the remote facility 80. For example, the vehicle electronics 20 can send the vehicle information to the remote facility 80 via the wireless communications device 30, the wireless carrier system 70, and/or the land network 76. Thus, the vehicle information can be obtained at the remote facility 80 from the vehicle electronics 20 via a remote connection.

In one embodiment, the vehicle electronics 20 can obtain onboard vehicle sensor data in response receiving an indication that the roadway on which the vehicle is travelling is banked—these indications can be referred to as roadway bank indicators. It should be appreciated that, in other embodiments, the onboard vehicle sensor data can be obtained continuously instead of being obtained in response to receiving an indication that the roadway on which the vehicle is travelling is banked. Although the particular roadway bank angle is not (or may not) yet be known to the vehicle electronics 20, the vehicle can nevertheless determine or detect an indication that the roadway (on which the vehicle is travelling) is banked. For example, when the inertial sensor data from the inertial sensor 44 indicates that the vehicle is inclined at a roll angle greater than a predetermined threshold (an example of a roadway bank indicator), then the vehicle information can be obtained. Other examples of roadway bank indicators are when the yaw rate is determined to exceed a predetermined threshold, when the suspension distance (as indicated by suspension sensor data from one or more suspension sensors 42, for example) is above and/or below a predetermined threshold, or when a lateral acceleration is above a predetermined threshold. Any combination of these and other roadway bank indicators can be used. The method 200 then continues to step 220.

In step 220, a roadway bank angle determination process is carried out. The roadway bank angle determination process is a process that determines a roadway bank angle of a roadway based on vehicle information from at least one vehicle. Two embodiments of a roadway bank angle determination processes are discussed herein with respect to FIG. 3 (process 300) and FIG. 7 (process 500), as will be explained in more detail below. The step 220 can be carried out at the vehicle using the vehicle electronics 20, or may be carried out at the remote facility 80. In some embodiments, parts of the roadway bank angle determination process can be carried out at the vehicle electronics 20 and other parts of the roadway bank angle determination processes can be carried out at the remote facility 80. Once the roadway bank angle is determined, the method 200 continues to step 230.

In step 230, a representative roadway bank angle is updated or otherwise established based on the roadway bank angle (e.g., the roadway bank angle determined in step 220). The remote facility 80 can store roadway bank angle information for a plurality of roadway segments or sections, and which may be identified based on their geographical location. For example, the roadway bank angle information stored at remote facility 80 can be a part of map or other navigational data and can include entries containing a roadway bank angle and an associated geographical location (e.g., geographical coordinate(s)). In other embodiments, the roadway bank angle information can be stored by other equipment at the remote facility 80, at other computers accessible via land network 76 and/or wireless carrier system 70, and/or at the vehicle electronics 20. Steps 210-220 can be carried out numerous times to determine roadway bank angles for various locations and can be based on vehicle information obtained from various vehicles. Thus, many different values representing the roadway bank angle of a particular location may be determined. The "representative roadway bank angle," as used herein, refers to an average, weighted, or representative value that is determined based on a plurality of roadway bank angle determinations. The representative roadway bank angle can be based on roadway bank angles that are determined using various processes (e.g., the vehicle-dynamics-based roadway bank angle determination process 300 (FIG. 3), the elevation-based roadway bank angle determination process 500 (FIG. 7)), from various vehicles, and at different times. The remote facility 80 can fuse or otherwise combine the various determined roadway bank angles to determine the representative roadway bank angle. Various weighting techniques can be used to determine the impact of any determined roadway bank angle on the representative roadway bank angle. The method 200 then ends.

Figure 3:
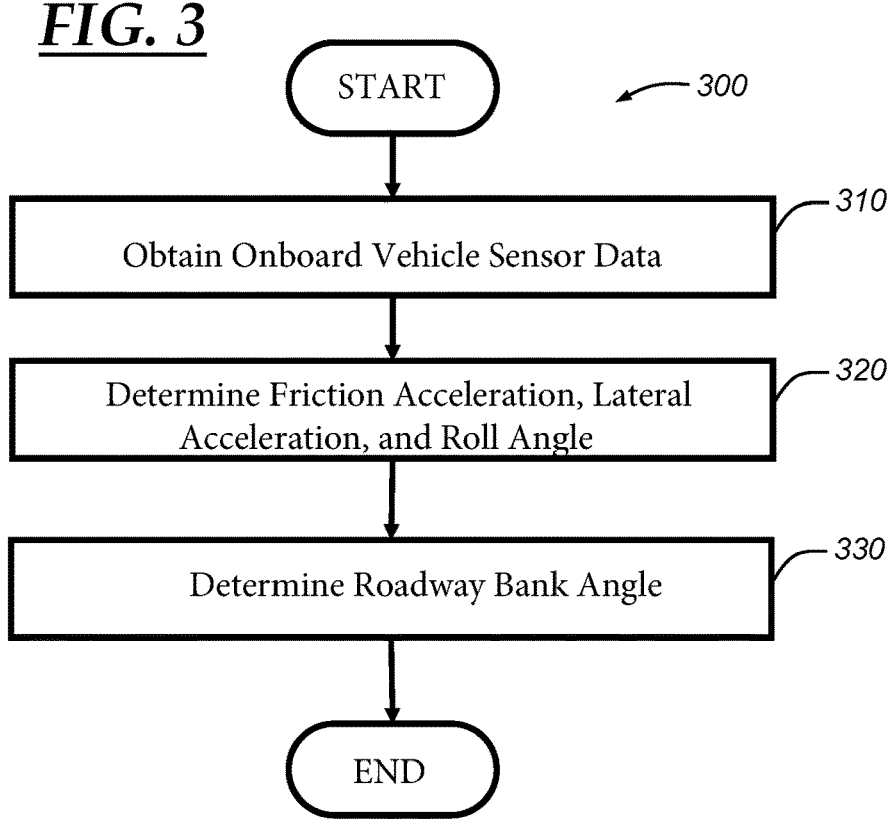
FIG. 3 is a flowchart depicting an embodiment of a vehicle-dynamics-based roadway bank angle determination process that can be carried out as a part of a method of determining a roadway bank angle based on vehicle information.

With reference to FIG. 3, there is shown a roadway bank angle determination process 300 that is carried out according to a vehicle-dynamics-based approach. This vehicle-dynamics-based roadway bank angle determination process 300 uses onboard vehicle sensor data to determine the roadway bank angle. In one embodiment, the onboard computer 22 can use the processor 24 to carry out the vehicle-dynamics-based roadway bank angle determination process 300. The process 300 starts with step 310, wherein onboard vehicle sensor data is obtained. In at least some embodiments, the vehicle-dynamics-based approach uses suspension sensor data and inertial sensor data from the vehicle electronics 20, which can be obtained as described above in step 210 of the method 200 (FIG. 2). In one embodiment, the onboard computer 22 can obtain the onboard vehicle sensor data from the one or more onboard vehicle sensors.

Figure 4:
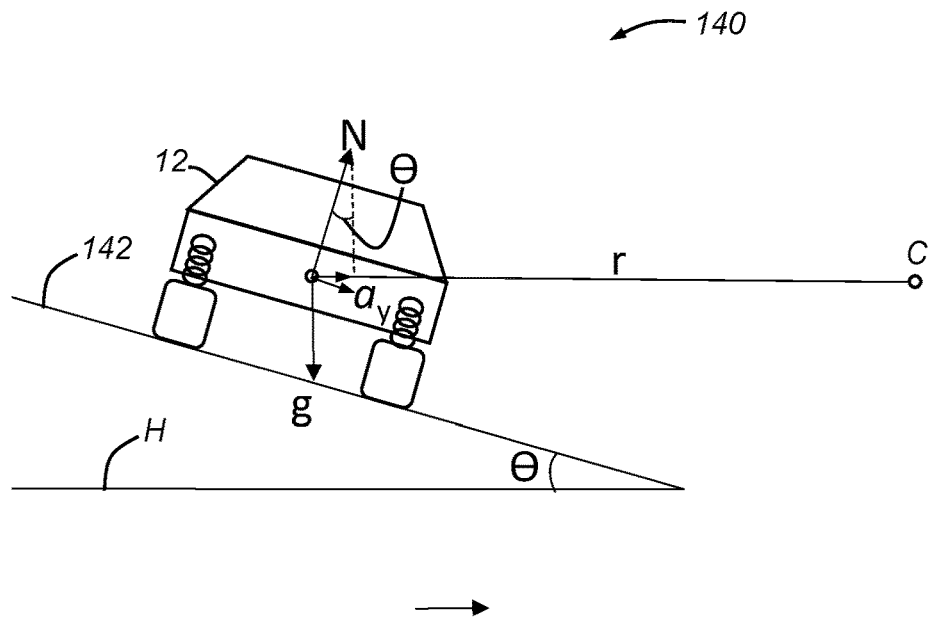
FIG. 4 is a diagram depicting a vehicle travelling around a roadway curve that is banked at an optimal roadway bank angle.
Figure 5:
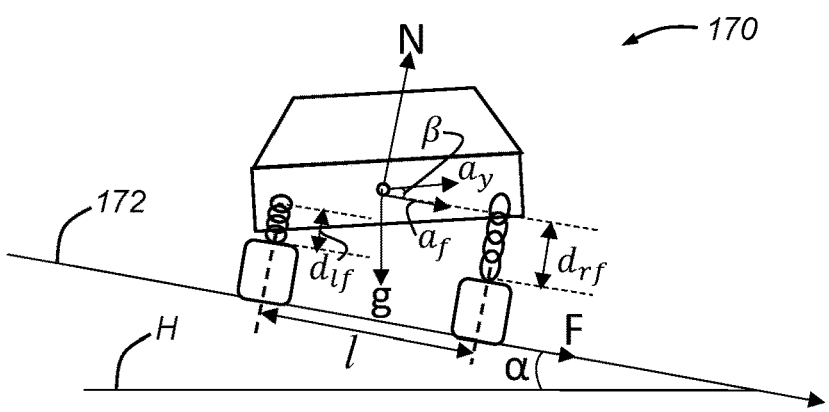
FIG. 5 is a diagram depicting a vehicle travelling around a roadway curve that is banked at a roadway bank angle, and where the vehicle experiences lateral friction.

With reference to FIGS. 4 and 5, there are shown diagrams that each depict forces acting on the vehicle 12 as the vehicle travels along a roadway curve that is banked at a roadway bank angle. FIG. 4 depicts a theoretical scenario 140 in which there is no lateral friction acting between the vehicle (e.g., the vehicle's tires) and the roadway surface 142. FIG. 5 depicts a scenario 170 in which friction between the vehicle (e.g., the vehicle's tires) and the roadway surface 172 contributes to the lateral acceleration $a_y$ of the vehicle 12. In the theoretical scenario 140, the centripetal or lateral acceleration $a_y$ can be given by $a_y = g \times \sin \theta$, where g is gravity and $\theta$ is the roadway bank angle—in scenario 140, the roadway bank angle is the angle between the roadway surface 142 and the horizontal direction H. Also, the relationship between the vehicle's speed v, the radius of the roadway curve r, and the roadway bank angle $\theta$ can be represented by the following equations:

$$N \times \sin \theta = \frac{mv^2}{r}, N \times \cos \theta = mg, \tan \theta = \frac{v^2}{rg} \quad (1)$$

where N is the normal force acting on the vehicle and m is the mass of the vehicle.

In the scenario 170 of FIG. 5, the centripetal or lateral acceleration $a_y$ of the vehicle is based on a normal force (due to gravity) and friction between the roadway and the vehicle (e.g., the vehicle's tires). When rounding the roadway curve in the scenario 170, the left-front suspension distance $d_{lf}$ is smaller than the right-front suspension distance $d_{rf}$. The angle between the vehicle body and the roadway surface 172 is considered the roll angle $\beta$, which can be determined (for example) based on the distances of the left-front suspension distance $d_{lf}$, the left-rear suspension distance $d_{lr}$, the right-front suspension distance $d_{rf}$, and the right-rear suspension distance $d_{rr}$, as well as the lateral (or horizontal) distance(s) between these points of measurement, which is represented by l. The lateral acceleration $a_y$ can be given by $a_y = a_f \cos \beta + g \sin(\beta - \alpha)$, where $\alpha$ is the roadway bank angle—in scenario 170, the roadway bank angle is the angle between the roadway surface 172 and the horizontal direction H. As will be discussed in more detail below, the roll angle $\beta$ can be determined using a suspension-to-roll angle function $h(\Delta D)$, where $\Delta D = \{\Delta d_{lf}, \Delta d_{rf}, \Delta d_{lr}, \Delta d_{rr}\}$. A left-front suspension distance can be represented as $\Delta d_{lf}$, a right-front suspension distance can be represented as $\Delta d_{rf}$, a left-rear suspension distance can be represented as $\Delta d_{lr}$, and a right-rear suspension distance can be represented as $\Delta d_{rr}$. As noted above, these suspension distances can represent a distance between a vehicle wheel (or the ground) and a reference point on the vehicle body, and/or may be represented as the change in distance between a resting suspension distance and a measured suspension distance, to cite a few possibilities.

The roll angle $\beta$ can then be used to determine a friction acceleration $a_f$ through use of a roll angle-to-friction acceleration function $H(\beta) = a_f$. The equation below can be used to solve for the roadway bank angle $\alpha$:

$$\alpha = \beta - \sin^{-1} \frac{a_y - a_f \cos \beta}{g} \quad (2)$$

Thus, once the suspension distances of the vehicle 12 are obtained through use of the suspension sensors 42 and the lateral acceleration $a_y$ is obtained through use of the inertial sensor 44 (and/or other movement sensors 46), the roadway bank angle α can be determined. With reference back to step 310 of FIG. 3, onboard vehicle sensor data from the suspension sensors 42 and the inertial sensor 44 can be gathered or otherwise obtained by the vehicle 12. The method 300 then proceeds to step 320.

In step 320, the friction acceleration $a_f$, the lateral acceleration $a_y$, and the roll angle β are determined. At least in one embodiment, inertial sensor data from the inertial sensor 44 is used to determine the magnitude of the lateral acceleration $a_y$. The friction acceleration $a_f$ can be determined using the above equations, including the suspension-to-roll angle function and/or the roll angle-to-friction acceleration function. In one embodiment, the suspension-to-roll angle function h(ΔD) and/or the roll angle-to-friction acceleration function H(β) can be mapping functions, and may be refined through machine learning techniques, such as neural networks, regression, etc. The roll angle β can be determined through the suspension-to-roll angle function h(ΔD), or may be determined or estimated using other known methodologies. The method 300 continues to step 330.

In step 330, the roadway bank angle α is determined based on the friction acceleration $a_f$ and the lateral acceleration $a_y$. In at least one embodiment, the Equation (2) identified above can be used to derive the roadway bank angle α based on the friction acceleration $a_f$, the lateral acceleration $a_y$, and the roll angle β.

In one embodiment, the method 300 can further include determining the friction acceleration $a_f$ based on one or more suspension-related parameters. These suspension-related parameters can include any parameters that can affect the suspension distances that are determined above, which can in turn affect the estimation of the friction acceleration. Exemplary suspension-related parameters that can influence the suspension distances and/or the friction acceleration $a_f$ include weight distribution (e.g., the weight distribution of objects, including passengers within the vehicle), roadway roughness (e.g., kinetic coefficient of friction between the vehicle's tires and the roadway), and other factors. Additionally, or alternatively, the method 300 can further include taking into account random sensor noise when determining the friction acceleration $a_f$. The differences in the friction acceleration due to the random sensor noise can be represented as $\epsilon_1$, and the differences in the friction acceleration due to the suspension-related parameters can be represented as $\epsilon_2$. At least in one embodiment, the following equation can be used to represent the roll angle-to-friction acceleration function H as it is affected by the random sensor noise and the suspension-related parameters:

$$a_f = H(\beta) = H(h(\Delta D)) + \epsilon_1 + \epsilon_2$$

The roll angle-to-friction acceleration function H is modified to take into consideration the weight distribution, the roadway roughness, and other factors. This modified roll angle-to-friction acceleration function can be denoted H' and can be represented by the following:

$$H'(h(\Delta D), w, R, A)$$

where w is a weight distribution index, R is a roadway roughness index, and A represents other suspension-related parameter values. The weight distribution index can be determined based on the suspension distances ΔD using a trained classifier W(•), such that the weight distribution index w=W(ΔD). The weight distribution index can be determined at a time prior to carrying out the method 300 (or other method discussed herein), such as at a time when the vehicle's ignition is started. Thus, in one embodiment, suspension distances can be obtained at a time when the vehicle is at rest and/or on a flat (and/or leveled) surface. The roadway roughness index R can be obtained based on the type of roadway (e.g., dirt, concrete) and/or measured through onboard vehicle sensors (e.g., wheel speed sensors, suspension sensors), and may be stored in a remote facility, such as the remote facility 80, at the vehicle electronics 20, or a combination thereof. Since the modified roll angle-to-friction acceleration function H' takes into consideration these suspension-related parameters, the differences in the friction acceleration due to the suspension-related parameters (represented by $\epsilon_2$) can be represented as:

$$\epsilon_2 = H(h(\Delta D)) - H'(h(\Delta D), w, R, A)$$

Of course, this represents one way of taking into consideration one or more suspension-related parameters, and other methods certainly may be used.

Figure 6:
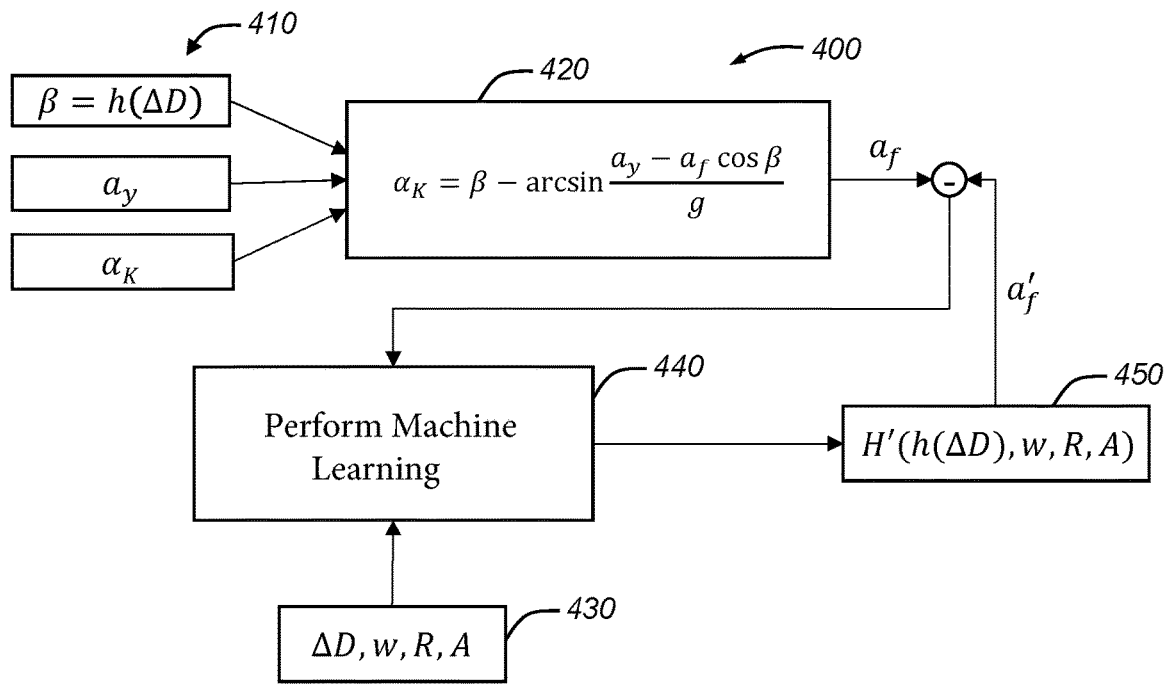
FIG. 6 is a flowchart depicting an embodiment of performing machine learning to improve a roll angle-to-friction acceleration function that can be used with various embodiments of the vehicle-dynamics-based roadway bank angle determination process of FIG. 3.

In some embodiments, the method 300 can further include performing online learning to improve the suspension-to-roll angle function h(ΔD) and/or the roll angle-to-friction acceleration function H(β). With reference to FIG. 6, there is shown a process 400 for performing online learning to refine the modified roll angle-to-friction acceleration function H'(β). Although the process 400 is described with respect to the modified roll angle-to-friction acceleration function H'(β) the process 400 can also be used to refine the roll angle-to-friction acceleration function H(β). Also, this process can be used to refine a suspension distance-to-friction acceleration function, which is a function that maps the suspension distances to a friction acceleration. This suspension distance-to-friction acceleration function can be developed based on combining the suspension-to-roll angle function h(ΔD) and the roll angle-to-friction acceleration function H(β) (or modified roll angle-to-friction acceleration function H'(β)). In this way, the suspension distance-to-friction acceleration function can directly map the suspension distances to a friction acceleration. This process 400 begins with step 410 in which a roll angle β, a lateral acceleration $a_y$, and a known bank angle $\alpha_K$ are determined or otherwise obtained. The known bank angle $\alpha_K$ is a known or estimated bank angle of the roadway on which the vehicle is travelling at the time of measuring the suspension distances. The known bank angle $\alpha_K$ can be obtained from a database or memory of the remote facility 80, and can be determined based on using the method 300 above with respect to other vehicles. In another embodiment, the method 500 (FIG. 7) discussed below can be used to provide a known bank angle $\alpha_K$. And, in another embodiment, roadway construction plans (or information) and/or map or navigational data can be used to provide the known bank angle $\alpha_K$. The roll angle β and the lateral acceleration $a_y$ can be determined as discussed above with respect to the method 300. The process 400 continues to step 420.

In step 420, the roll angle β, the lateral acceleration $a_y$, and the known bank angle $\alpha_K$ are used to derive or otherwise determine friction acceleration $a_f$. The following equation can be used to determine a friction acceleration $a_f$.

$$a_f = \frac{a_y - g\sin(\beta - \alpha)}{\cos \beta}$$

After step 420, the friction acceleration $a_f$ can be combined or adjusted based on feedback friction acceleration information, which is represented as $a'_f$. The friction acceleration $a_f$ can then be passed into a machine learning process, such as is shown in FIG. 6. The process 400 continues to step 430.

In step 430, onboard vehicle sensor data is obtained. This onboard vehicle sensor data can include suspension distances ΔD and, in one embodiment, can include suspension-related parameter values, such as a weight distribution index w, a roadway roughness index R, and other suspension-related parameter values A. The process 400 continues to step 440.

In step 440, machine learning is carried out to improve the roll angle-to-friction acceleration function H. As mentioned above, the machine learning can take into consideration the friction acceleration $a_f$ as determined above (step 420), as well as onboard vehicle sensor data and/or suspension-related parameter values. Various machine learning techniques can be used, such as neural networks, regression, etc. The output of the machine learning is represented in step 450, which can be a modified roll angle-to-friction acceleration function H' that takes into consideration certain suspension-related parameter values and/or onboard vehicle sensor data. Then, the modified roll angle-to-friction acceleration function H' can be used to determine feedback friction acceleration information $a'_f$ that can be used in subsequent iterations of the process 400. The process 400 can carry out repeated iterations to continue learning or may end.

With reference to FIG. 7, there is shown a roadway bank angle determination process 500 that is carried out according to an elevation-based approach. The elevation-based approach uses GNSS data to determine the roadway bank angle. The elevation-based approach can be carried out by one or more computers or servers of a remote facility, such as by one or more remote computers (e.g., remote computer 82) at the remove facility 80. However, in some embodiments, one or more of the steps 510-550 can be carried out by the vehicle electronics 20.

Figure 8:
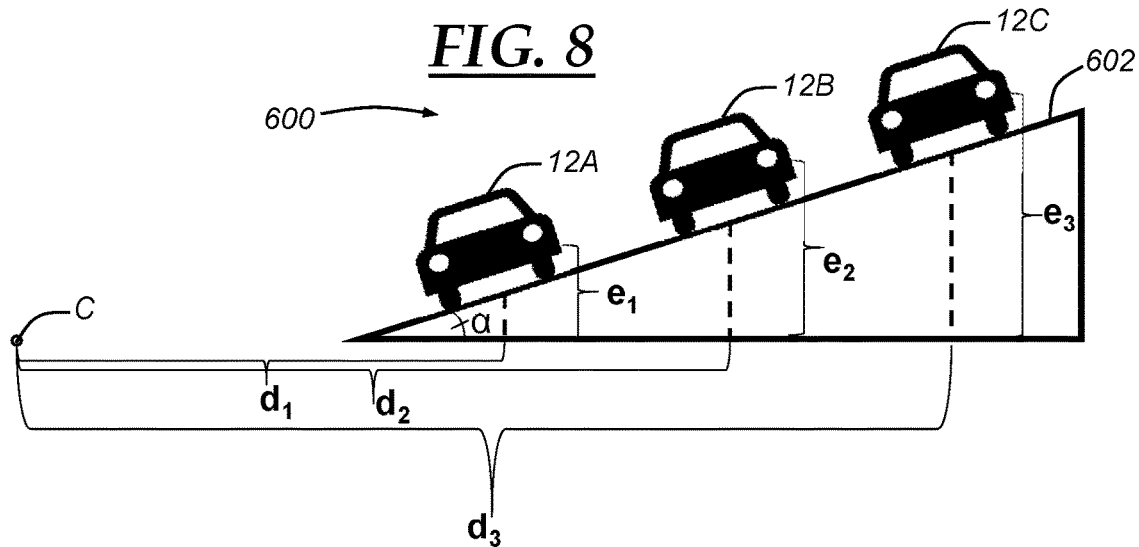
FIG. 8 is a diagram depicting multiple vehicles travelling around a roadway curve that is banked.

With reference to FIG. 8, there is shown a diagram depicting multiple vehicles travelling around a roadway curve that is banked. A plurality of vehicles 12A-C are travelling along the roadway 600, which is banked at a roadway bank angle α. These vehicles 12A-C can be the same or similar to the vehicle 12 discussed above. The first vehicle 12A is travelling along the roadway 600 (on the roadway surface 602) at a radial distance $d_1$ from the center of curvature C of the roadway curve, the second vehicle 12B is travelling along the roadway 600 at a radial distance $d_2$ from the center of curvature C of the roadway curve, and the third vehicle 12C is travelling along the roadway 600 at a radial distance $d_3$ from the center of curvature C of the roadway curve. Also, the first vehicle 12A is located at a first elevation $e_1$, the second vehicle 12B is located at a second elevation $e_2$, the third vehicle 12C is located at a third elevation $e_3$.

With reference back to FIG. 7, the process 500 starts with step 510, wherein GNSS data is obtained. In at least some embodiments, the elevation-based approach uses GNSS data from the GNSS receiver 48 of the vehicle electronics 20, which can be obtained as described above in step 210 of the method 200 (FIG. 2). This GNSS data can include a geographical location of the vehicle 12, which can be determined by the GNSS receiver 48 based on information contained in a plurality of GNSS signals received from the plurality of GNSS satellites 60. The geographical location can include an elevation (or elevation coordinate or altitude data from barometer sensors (which can be included as a part of the vehicle electronics)) and, in one embodiment, the geographical location includes an elevation, a latitudinal coordinate, and a longitudinal coordinate. In some embodiments, the GNSS data can be used to determine trajectory information of the vehicle, including a vehicle speed and a vehicle heading. In embodiments where the subsequent process steps are carried out at a remote facility, all or part of the GNSS data can be sent from the vehicle to the remote computer 82 (or other portion of the remote facility 80) via use of the wireless communications device 30. In at least one embodiment, the remote facility 80 can receive GNSS data from a plurality of vehicles (e.g., vehicles 12A-C) and, then, this GNSS data from the plurality of vehicles can be used to determine a roadway bank angle, as discussed more below. The process 500 continues to step 520.

In step 520, roadway map data is obtained. The roadway map data includes map and/or other types of navigational information that digitally represents geographical areas of the earth that include roadways. The roadway map data can include roadway boundary information, roadway dimensions, roadway attributes (e.g., speed limit, permitted direction of travel, lane information, traffic signal information), roadway conditions (e.g., present or estimated traffic conditions, predicted and/or observed weather conditions among the roadway), and various other information. In one embodiment, the roadway map data can also include or be based on topographical map information. In embodiments where the process 500 is carried out by the remote facility 80, the roadway map data can be obtained from a remote server or computer that is separate from the remote facility 80 or from internal map data collections. This separate remote server or computer can be a third party server that provides open source map (OSM) data, which can include roadway map data. The remote facility 80 can obtain this roadway map data through downloading the roadway map data over a remote connection to the separate remote server or computer, such as through use of land network 76. The process 500 continues to step 530.

In step 530, a curvature extraction process is performed using the roadway map data. In at least one embodiment, the curvature extraction process extracts (or determines the location of) a representative radius and center of curvature from the roadway map data. This process can identify a roadway curve of a roadway through inspecting the roadway map data, and can then determine roadway curve information. The roadway curve information can be any information concerning the roadway curve, such as geometrical information of the roadway curve, which includes a location of a center of curvature of the roadway curve, distance(s) (or radius(es)) between the roadway and the center of curvature, arc length of the roadway curve, etc. According to the non-limiting example in FIG. 8, the center of curvature C results in the radii $d_1$, $d_2$, and $d_3$. The roadway map data can include a plurality of reference points corresponding to the roadway curve, which can be fitted to a circle using a least squares fit method. A representative radius of the roadway can be measured from the center of curvature to the middle of the roadway along the roadway curve, an inner edge of the roadway, an outer edge of the roadway, etc. In at least one embodiment, once the reference points of the roadway map data are fitted to a circle, the representative radius can be extracted or otherwise determined.

In one embodiment, the steps 520 and/or 530 can be carried out in response to receiving GNSS data from one or more vehicles. In such embodiments, a general area in which the vehicle(s) are located can be determined, and then the roadway map data can be obtained based on the location of the vehicle(s). In other embodiments, the steps 520 and/or 530 can be carried out prior to receiving the GNSS data. In one embodiment, the process 500 can further include a step of identifying areas in which there is a roadway curve, which can be defined as a path along a roadway in which the degree of curvature is above some predetermined threshold; however, in other embodiments, this step may be omitted. The process 500 continues to step 540.

In step 540, the geographical location(s) (included in or determined from the GNSS data) are transformed to a suitable coordinate system, such as polar coordinates. In one embodiment, the GNSS data obtained in step 510 includes a geographical location of the vehicle. The geographical location can include GNSS coordinates, which can be represented by Cartesian coordinates, such as a latitudinal coordinate, a longitudinal coordinate, and an elevation coordinate. These Cartesian coordinates are transformed to polar coordinates using known methodologies as appreciated by those skilled in the art. The coordinates of the geographical location can be transformed by calculating the distance and angle(s) from the center of curvature for each of the geographical location(s). These geographical coordinates that are transformed to polar coordinates can be referred to as transformed geographical coordinates. In some embodiments, this transformation step may not be necessary or desired and, thus, any references to "geographical coordinates" or "geographical location" provided herein may refer to Cartesian coordinates or polar coordinates, for example. The polar coordinates can represent the radial distances of the vehicles from the center of curvature (e.g., radial distances $d_1$, $d_2$, $d_3$ (FIG. 8)) as well as the elevation of the vehicle(s) (e.g., elevations $e_1$, $e_2$, $e_3$ (FIG. 8)). The process 500 continues to step 550.

Figure 9:
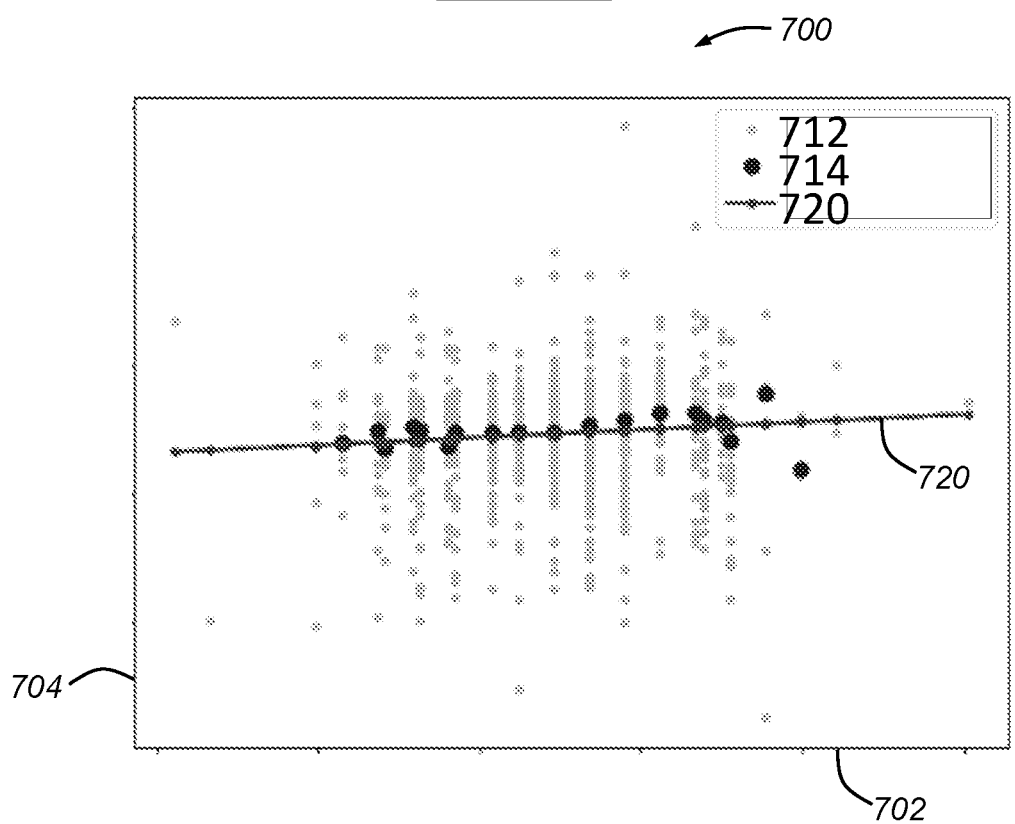
FIG. 9 is a graph illustrating a linear regression result representing a roadway bank angle along a portion of a roadway curve that is obtained based on processing GNSS data from a plurality of vehicles.

In step 550, the transformed geographical location(s) are fitted to a slope using a slope fitting technique to determine a roadway bank angle. In at least some embodiments, a linear regression technique is used in which the transformed geographical location(s) are fitted to a linear regression line, such as is depicted in FIG. 9. FIG. 9 depicts a graph 700 representing radial distance-elevation data points representing a portion of a roadway curve. The x-axis 702 represents a distance from the center of curvature, and the y-axis 704 represents elevation. The small dots (or radial distance-elevation data points) 712 represent geographical coordinates of various vehicles, the large dots 714, which are also radial distance-elevation data points, represent representative geographical coordinates for a particular radial distance (or range of radial distances) from the center of curvature, and the line 720 is the linear regression line that is determined from the transformed geographical location(s) (or the radial distance-elevation data points). In one embodiment, each representative geographical coordinate 714 can be provided for a particular radial distance (or range of radial distances) from the center of curvature and, in such a case, each representative geographical coordinate 714 can include a representative elevation value, which can be a mean or median of the elevation as taken by points at the particular radial distance (or within the range of radial distances). These points can be determined based on the radial distances of the vehicles from the center of curvature (e.g., radial distances $d_1$, $d_2$, $d_3$ (FIG. 8)) as well as the elevation of the vehicle(s) (e.g., elevations $e_1$, $e_2$, $e_3$ (FIG. 8)), which can be represented by or based on information contained in (or derivable from) the transformed geographical location(s). The linear regression line 720 can then be determined from these representative geographical coordinates 714 using a linear regression technique. The slope of the linear regression line 720 can be used to determine the roadway bank angle α. The roadway bank angle α corresponds to the angle between the linear regression line 720 and a reference line that is parallel to the x-axis. This linear regression line 720 can be seen as representing the roadway surface, such as the roadway surface 602 as shown in FIG. 8. Of course, in other embodiments, other regression and slope fitting techniques can be used. The process 500 then ends, or can be carried out again for repeated execution and to continuously update the roadway bank angle.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of determining a roadway bank angle based on vehicle information, the method comprising the steps of:
   obtaining vehicle information from at least one vehicle, the vehicle information is obtained from at least one of a global navigational satellite system (GNSS) receiver and one or more onboard vehicle sensors, and the GNSS receiver and the one or more onboard vehicle sensors are installed in the at least one vehicle;
   performing a first roadway bank angle determination process using the obtained vehicle information to obtain a first roadway bank angle, wherein the first roadway bank angle determination process is a vehicle-dynamics-based roadway bank angle determination process;
   performing a second roadway bank angle determination process using the obtained information to obtain a second roadway bank angle, wherein the second roadway bank angle determination process is an elevation-based roadway bank angle determination process; and
   updating a representative roadway bank angle based on the first roadway bank angle and the second roadway bank angle.

2. The method of claim 1, wherein the obtaining vehicle information step includes obtaining onboard vehicle sensor data from the one or more onboard vehicle sensors of the at least one vehicle.

3. The method of claim 2, wherein the onboard vehicle sensor data includes suspension sensor data from a plurality of suspension sensors installed on the at least one vehicle.

4. The method of claim 3, wherein the vehicle-dynamics-based roadway bank angle determination process includes determining a friction acceleration of the at least one vehicle based on the suspension sensor data.

5. The method of claim 4, wherein the vehicle-dynamics-based roadway bank angle determination process includes determining a roll angle of the at least one vehicle.

6. The method of claim 5, wherein the roll angle is determined based on the suspension sensor data using a suspension-to-roll angle function.

7. The method of claim 4, wherein the vehicle-dynamics-based roadway bank angle determination process includes determining the friction acceleration through use of a roll angle-to-friction acceleration function or a suspension distance-to-friction acceleration function, and determining a lateral acceleration of the at least one vehicle based on the onboard vehicle sensor data.

8. The method of claim 7, wherein the following equation is used to determine the roadway bank angle $\alpha$ using the friction acceleration $a_f$, the lateral acceleration $a_y$, gravity g, and roll angle $\beta$:

$$\alpha = \beta - \sin^{-1}\frac{a_y - a_f \cos \beta}{g}.$$

9. The method of claim 7, wherein the roll angle-to-friction acceleration function is a modified roll angle-to-friction acceleration function that takes into consideration a weight distribution index and a roadway roughness index.

10. The method of claim 1, wherein the vehicle information includes GNSS data that is used to obtain a geographical location of the at least one vehicle, and wherein the GNSS data includes an elevation of the at least one vehicle and is obtained from the GNSS receiver installed in the at least one vehicle.

11. The method of claim 10, wherein the elevation-based roadway bank angle determination process includes obtaining roadway map data of an area that contains the geographical location of the at least one vehicle and that includes a portion of a roadway with a roadway curve that is banked.

12. The method of claim 11, wherein a curvature extraction process is carried out using the roadway map data to extract roadway curve information concerning the roadway curve, wherein the roadway curve information includes a geographical point representing a center of curvature of the roadway curve.

13. The method of claim 12, wherein the elevation-based roadway bank angle determination process includes performing linear regression on a plurality of radial distance-elevation data points derived from a plurality of vehicles travelling along the roadway curve.

14. The method of claim 13, wherein a linear regression result is obtained from the linear regression, and wherein the roadway bank angle is determined based on the linear regression result.

15. The method of claim 12, wherein the method is carried out at a remote facility that is located remotely from the at least one vehicle, wherein the at least one vehicle includes a first plurality of vehicles and a second plurality of vehicles, wherein the elevation-based roadway bank angle determination process is carried out for the first plurality of vehicles and for the second plurality of vehicles, and wherein the updating step includes aggregating results of the elevation-based roadway bank angle determination processes for the first plurality of vehicles and for the second plurality of vehicles to obtain the representative roadway bank angle.

16. The method of claim 1, wherein the at least one vehicle is a plurality of vehicles, wherein the method includes performing a plurality of roadway bank angle processes for the plurality of vehicles, and wherein the updating step includes fusing or otherwise combining results of each of the plurality of roadway bank angle processes to obtain the representative roadway bank angle.

17. A system for determining a roadway bank angle based on vehicle information, the system comprising:
one or more onboard vehicle sensors; and
a processor configured to:
obtain first vehicle information from the one or more onboard vehicle sensors;
obtain second vehicle information from a global navigational satellite system (GNSS) receiver;
perform a first roadway bank angle determination process using the first vehicle information to obtain a first roadway bank angle, wherein the first roadway bank angle determination process is a vehicle-dynamics-based roadway bank angle determination process;
perform a second roadway bank angle determination process using the second information to obtain a second roadway bank angle, wherein the second roadway bank angle determination process is an elevation-based roadway bank angle determination process; and
update a representative roadway bank angle based on the first roadway bank angle and the second roadway bank angle.

18. The system of claim 17, wherein the processor is configured to update the representative roadway bank angle by fusing the first roadway bank angle and the second roadway bank angle.

* * * * *